United States Patent [19]  
Hutchinson, Sr. et al.

[11] Patent Number: 4,989,537  
[45] Date of Patent: Feb. 5, 1991

[54] WEAR INDICATOR FOR VEHICLE AIR BRAKES

[76] Inventors: Jerry W. Hutchinson, Sr., Rte. 1, Box 1568; Jerry W. Hutchinson, Jr., 61 Summit Dr., both of Grandview, Wash. 98930; James C. McMinimee, 1262 Price Rd., Outlook, Wash. 98938

[21] Appl. No.: 387,807

[22] Filed: Aug. 1, 1989

[51] Int. Cl.⁵ ................. G01D 13/00; F16D 66/02
[52] U.S. Cl. ......................... 116/208; 116/283; 188/1.11
[58] Field of Search .......... 116/208, 272, 281, 283, 116/DIG. 21; 188/1.11; 340/454

[56] References Cited

U.S. PATENT DOCUMENTS

| | | | |
|---|---|---|---|
| 1,569,133 | 1/1926 | Ostrander | 116/283 |
| 1,635,349 | 7/1927 | Sandilands | 116/281 X |
| 3,298,466 | 1/1967 | Ayers, Jr. et al. | 188/1.11 |
| 4,800,991 | 1/1989 | Miller | 188/1.11 |

Primary Examiner—William A. Cuchlinski, Jr.
Assistant Examiner—W. Morris Worth
Attorney, Agent, or Firm—Christensen, O'Connor, Johnson & Kindness

[57] ABSTRACT

A brake wear indicator for an air brake system that includes an actuator having a diaphragm adapted to move within the actuator in response to air pressure, and a push rod mechanically coupled to the diaphragm and extending from the actuator through an opening in the actuator wall. The brake wear indicator comprises marking means having a generally cylindrical outer surface, a longitudinal axis, a distance indicator on the outer surface, and means for securing the marking means to the push rod within the opening. The marking means thereby provides a visual indication of the position of the push rod along such axis at the opening. In a preferred embodiment, the marking means comprises a tubular member having an internal diameter large enough to accommodate the push rod, and an outside diameter small enough to permit the tubular member to move through the opening, and a flange having an outside diameter too large to fit through the opening. An indicator formed integrally with the push rod is also disclosed.

3 Claims, 1 Drawing Sheet

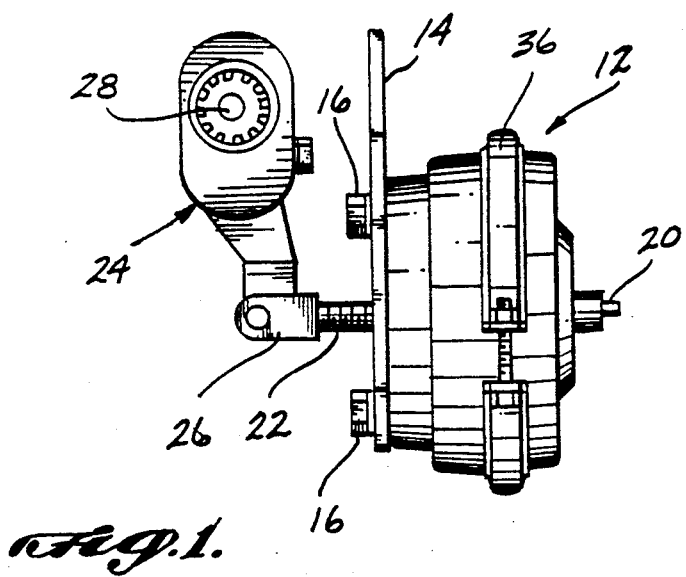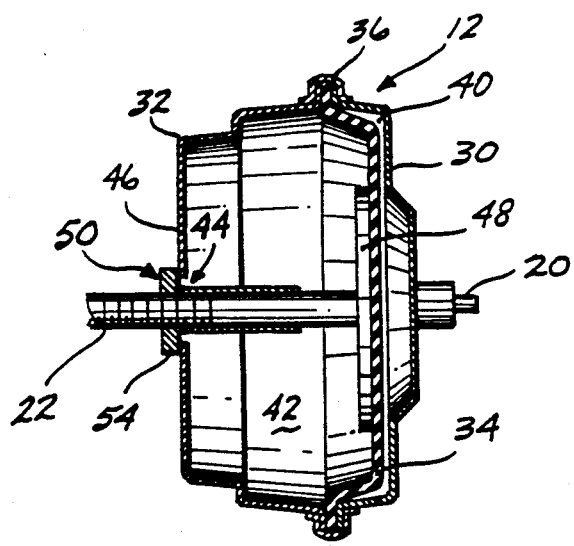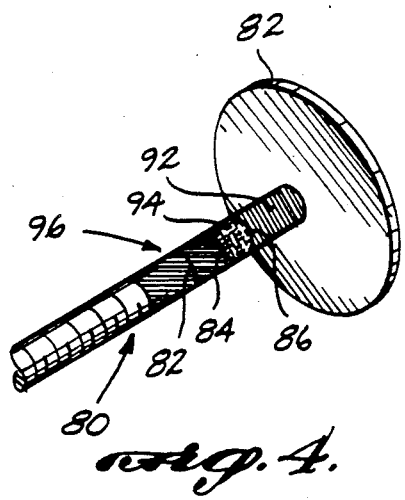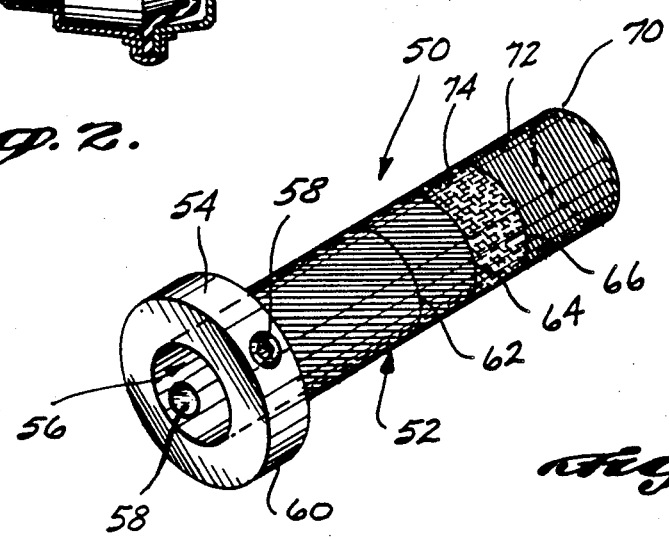

4,989,537

WEAR INDICATOR FOR VEHICLE AIR BRAKES

FIELD OF THE INVENTION

The present invention relates to air brake systems for motor vehicles and, in particular, to a device for indicating the degree of wear of such brakes.

BACKGROUND OF THE INVENTION

A common type of air brake system for trucks utilizes an actuator associated with each brake. The actuator has an opening in one side through which a push rod extends, the push rod being in turn connected to the actual vehicle brake through a suitable mechanical linkage.

When the vehicle brakes are not being applied, a spring or the like within the actuator holds the push rod in a relatively retracted position in which the brake is off. However, when an operator applies the brakes, pressurized air is supplied to the actuator, the pressurized air causing the push rod to move along its longitudinal axis, in a direction out of the actuator. This movement continues until the brake engages and provides a return force that balances the force provided by the air pressure.

As the brake wears, the push rod must move through a larger and larger distance from its retracted position to an extended position in which the brake is applied. If the process continues uncorrected, the push rod travel will gradually reach its upper limit, determined by the geometry of the actuator. When this occurs, the brakes will not be effective, even when fully applied by the vehicle operator. Because of this, in the U.S., trucking regulations place an upper limit of two inches on the maximum amount of push rod travel between its retracted and extended positions.

Two basic types of solutions have been provided to address the problem of wear in air brake systems. The first of these solutions is a device known as a slack adjuster that is included in the linkage between the push rod and the brake. A slack adjuster removes slack from this linkage, thereby reducing the amount of push rod travel necessary before the brakes are applied. Both automatic and manual slack adjusters are well known and in use. In an automatic slack adjuster, the slack removal operation is automatic, and occurs whenever a predetermined degree of slack develops in the linkage. However, an automatic slack adjuster is a relatively expensive and complex device, and is subject to occasional malfunction. A manual slack adjuster must be adjusted manually whenever sufficient push rod travel develops in the brake system. However in general, an operator has no means of readily determining when such wear exists.

In order to overcome the limitations of existing slack adjusters, a variety of brake wear indicators have been devised to provide an indication to an operator that excess push rod travel has developed. For example, U.S. Pat. No. 4,279,214 describes a break wear indicator that comprises a sleeve that extends around the push rod and through the opening in the actuator through which the push rod extends. A relatively loose fit is provided between the indicator and the push rod, and a comparatively snug fit is provided between the indicator and the actuator. When the brakes are applied, the indicator is forced out of the actuator along with the push rod. When the brakes are subsequently released, the fit between the indicator and the actuator prevents the indicator from retracting. Thus at any given time, visual inspection of the indicator will indicate the maximum travel of the push rod since the indicator was last reset into its retracted position. While effective in principle, the brake wear indicator proposed in this patent suffers from the problem that there is considerable variation in the size of the opening in the side of the actuator through which the push rod extends. Thus, in practice, indicators of various outside diameters must be provided in order to cover the different brands and models of actuators currently in use.

Another prior brake wear indicator is described in U.S. Pat. No. 4,757,300. In one embodiment described therein, a block containing a magnetically sensitive read switch is mounted to the actuator, and a magnet is mounted to the push rod. These elements are so positioned such that excessive push rod travel causes the magnet to change the reed switch position, actuating visual and audio alarms in the cabin of the vehicle. This is thus a relatively complex and expensive solution to the problem, and is potentially difficult to maintain in correct adjustment and calibration.

A third prior brake wear indicator is described in U.S. Pat. No. 4,776,438. In this device, the actuator consists of an arm that is secured to the vehicle frame or actuator, the arm including a pointing indicator that can be set at a desired position along the length of the arm. The pointing indicator provides a visual indication of a farthest safe travel of the push rod when the brakes are applied. Although simple in construction, this brake wear indicator suffers from the problem that different readings can be obtained depending upon the angle at which the indicator and push rod are viewed.

SUMMARY OF THE INVENTION

The present invention provides a brake wear indicator that is extremely simple and inexpensive in construction, but that can be easily installed on virtually all trucks currently in use. In the preferred embodiment, the brake wear indicator comprises marking means having a generally cylindrical outer surface, a longitudinal axis, and a distance indicator on the outer surface. The distance indicator indicates distance along the longitudinal axis. The indicator also comprises means for securing the marking means to the push rod of a vehicle air brake system within the opening in the wall of the actuator, such that the marking means provides a visual indication of the position of the push rod along the longitudinal axis at said opening.

In a preferred embodiment, the marking means comprises a tubular member having an internal diameter large enough to permit the push rod to extend through the tubular member, and an outside diameter small enough to permit the tubular member to freely move through the opening in the actuator wall. The indicator further comprises a flange secured to the tubular member, the flange having an outside diameter too large to fit through such opening. One or more set screws mounted within the flange are used to secure the indicator to the push rod. The indicator may thereby be installed by sliding it over the push rod, and then along the push rod such that the tubular member extends into the actuator, and the sleeve abuts the outer wall of the actuator with the vehicle brakes not applied. The indicator is then secured to the push rod by the set screws. Thereafter, the indicator travels along with the push rod, and provides the visual indication of push rod travel. In an alternative embodiment, the marking means is constructed to be integral with the push rod.

BRIEF DESCRIPTION OF THE DRAWINGS

FIG. 1 is a side elevational view of a portion of a vehicle air brake system.

FIG. 2 is a cross section of the actuator with the indicator of the present invention installed.

FIG. 3 is a perspective view of a preferred embodiment of the indicator of the present invention.

FIG. 4 is a partial perspective view of a second preferred embodiment of the invention.

DETAILED DESCRIPTION OF THE INVENTION

FIG. 1 illustrates a portion of a conventional brake system for a vehicle such as a truck. The system includes actuator 12 that is bolted to support 14 by a pair of mounting bolts 16. Support 14 is in turn attached to the vehicle axle assembly. Actuator 12 includes air nipple 20 for receiving pressurized air, and push rod 22 extending from the actuator. Push rod 22 is connected to slack adjuster 24 via yoke assembly 26. The slack adjuster is in turn connected to the vehicle's brakes via shaft 28. In operation, when a driver applies the brakes, pressurized air is supplied to actuator 12 via nipple 20. In response, push rod 22 moves to the left, rotating slack adjuster 24 and shaft 28 in a clockwise direction, causing the vehicle brakes to be applied.

FIG. 2 shows a cross-sectional view of actuator 12, with the brake wear indicator of the present invention installed. Actuator 12 comprises half sections 30 and 32 and bladder 24 held together by clamp 36. Bladder 34 is composed of a flexible elastomeric material, and divides the interior of the actuator into first chamber 40 and second chamber 42. Push rod 22 extends into the actuator via opening 44 in side wall 46 of half section 32, and terminates in plate 48 that rests against the bladder. A spring (not shown) extends between plate 48 and side wall 46, and forces the plate and therefore the push rod to the right, such that the plate is held firmly against the bladder.

Referring now to FIGS. 2 and 3, in a preferred embodiment, brake wear indicator 50 comprises a tubular member 52 integrally connected with flange 54. Circular opening 56 extends longitudinally for the full length of the indicator, and the inside diameters of tubular member 52 and flange 54 are identical, such that opening 56 has a constant diameter. Flange 54 includes mounting screws 58 that extend radially from the outer circumference 60 of the flange to the inner surface of the flange. The external surface of tubular member 52 includes distance indicators 62, 64, and 66 that extend circumferentially about the tubular member. Preferably, distance indicators 62, 64 and 66 are positioned one inch, one and one-half inches, and two inches, respectively, from flange 54.

FIG. 2 shows brake wear indicator 50 installed in a vehicle air brake system. Indicator 50 is mounted on push rod 22, the mounting being accomplished by temporarily disconnecting yoke 26 from slack adjuster 24. With the vehicle brakes off, distance indicator is slid along push rod 22 until flange 54 contacts the side wall 46 of actuator 12. In this position, tubular members 52 extend through opening 44 into the actuator. Screws 58 are then turned until they bear against push rod 22, thereby locking indicator 50 to the push rod.

In order to determine the relative amount of brake wear, the vehicle's air brakes are applied, thereby providing pressurized air via nipple 20 into first chamber 40. The pressurized air causes bladder 34 to move leftward, pushing plate 40 and push rod 22 to the left. The brake wear indicator is carried on the push rod, and tubular member 52 therefore also moves out of the actuator through opening 44. With the brakes still applied, a visual inspection of the indicator and actuator will quickly reveal the degree to which the indicator has moved out of the actuator. In particular, a visual inspection is made to determine the amount of tubular member 52 that is visible outside the actuator when the indicator is viewed from the side, as in FIG. 2. If distance indicator 66 is visible, then this indicates that there is at least two inches of slack in the linkage, and that a brake adjustment if required. If distance indicator 64 is visible but distance indicator 66 is not visible, it is an indication that the brakes have almost reached the legal limit, and that adjustment or maintenance should be carried out in the very near future.

Preferably, different sections of the outer surface of tubular member 52 are colored in such a way as to visually indicate the significance of those sections being visible outside the actuator when the brakes are applied. In particular, section 72 between distance indicator 66 and end 70 is preferably red, section 74 between distance indicators 64 and 66 is preferably yellow, and the remainder of the outer surface between flange 54 and distance indicator 64 is preferably green. Such colors provide a universally recognizable cue as to the significance of the appearance of different portions of tubular member 52 when the vehicle brakes are applied. The coloring may be effected by means of an electrostatic pigment process, or by other suitable techniques.

The inside diameter of indicator 50, i.e., the diameter opening 56, is preferably sized such that it can accommodate all common push rod sizes. A preferred inside diameter is ⅝ inches. The outside diameter of tubular member 52 must be small enough such that it can move freely within opening 44. A suitable outside diameter is ¾ of an inch. Finally, the outer diameter of flange 54 should be large enough such that it cannot fit within opening 44. A suitable outside diameter is 13/16 inches.

A second preferred embodiment of the invention is illustrated in FIG. 4. In this embodiment, push rod 80 is formed integrally with plate 82, and the marking means is formed integrally on the push rod. In particular, push rod 80 comprises distance indicators 82, 84, and 86 that are located on the push rod at positions corresponding to distance indicators 62, 64, and 66, respectively, in the embodiment of FIG. 3. Thus the relative positions of distance indicators 82–86 will depend upon the width of the actuator with which the push rod/plate is used. As with the embodiment of FIG. 3, section 92 of the outer surface of the push rod between distance indicator 86 and plate 82 is preferably red, section 94 between distance indicators 84 and 86 is preferably yellow, and section 96 on the other side of distance indicator 84 is preferably green.

While the preferred embodiments of the invention have been described, variations will be apparent to those skilled in the art. Accordingly, the scope of the invention is to be determined by reference to the following claims.

We claim:

1. A brake wear indicator for a motor vehicle air brake system, the air brake system comprising an actuator having a diaphragm adapted to move within the actuator in response to application of pressurized air to the actuator, a push rod having a first end mechanically coupled to the diaphragm, the push rod extending from the actuator through an opening in a wall thereof, and coupling means for coupling the push rod to a brake of the vehicle, the indicator comprising:

marking means comprising a tubular member having an internal diameter large enough to permit the push rod to extend therethrough, and an outside diameter small enough to permit the tubular member to move through said opening, said marking means having a generally cylindrical outer surface, a longitudinal axis, a distance indicator on the outer surface for indicating distance along said longitudinal axis, and means for securing the marking means to the push rod within said opening, such that the marking means provides a visual indication of the position of the push rod along the longitudinal axis at said opening; said tubular member, when secured, extending along said push rod from a point adjacent said opening into said actuator.

2. The indicator of claim 1, further comprising a flange secured to the tubular member, the flange having an outside diameter too large to fit through said opening.

3. The indicator of claim 2, wherein the means for securing the marking means to the push rod comprises a screw radially mounted within the flange.

* * * * *